United States Patent
Raynor

(10) Patent No.: US 11,587,527 B2
(45) Date of Patent: Feb. 21, 2023

(54) METHOD AND DEVICE FOR AMBIENT LIGHT MEASUREMENT

(71) Applicant: STMicroelectronics (Research & Development) Limited, Marlow (GB)

(72) Inventor: Jeffrey M. Raynor, Edinburgh (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 11 days.

(21) Appl. No.: 17/127,223

(22) Filed: Dec. 18, 2020

(65) Prior Publication Data

US 2021/0193079 A1 Jun. 24, 2021

(30) Foreign Application Priority Data

Dec. 19, 2019 (EP) .................... 19218320

(51) Int. Cl.
| | |
|---|---|
| G09G 5/10 | (2006.01) |
| G01J 1/02 | (2006.01) |
| G01J 1/42 | (2006.01) |
| G01J 1/44 | (2006.01) |
| G09G 3/32 | (2016.01) |

(52) U.S. Cl.
CPC .............. *G09G 5/10* (2013.01); *G01J 1/0247* (2013.01); *G01J 1/4204* (2013.01); *G01J 1/44* (2013.01); *G01J 2001/4466* (2013.01); *G09G 3/32* (2013.01); *G09G 2310/08* (2013.01); *G09G 2320/0626* (2013.01); *G09G 2360/144* (2013.01)

(58) Field of Classification Search
CPC .......... G01J 1/0247; G01J 1/4204; G01J 1/44; G01J 2001/4466; G09G 2310/08; G09G 2320/0626; G09G 2360/14; G09G 2360/141; G09G 2360/144; G09G 5/10
See application file for complete search history.

(56) References Cited

U.S. PATENT DOCUMENTS

| | | | |
|---|---|---|---|
| 6,969,897 B2 | 11/2005 | Kim, II | |
| 6,998,659 B2 | 2/2006 | Raynor | |
| 9,602,747 B2 | 3/2017 | Scott et al. | |
| 2010/0245309 A1* | 9/2010 | Matsuki | G01J 1/02 345/82 |
| 2012/0132809 A1 | 5/2012 | Findlay | |
| 2014/0191115 A1* | 7/2014 | Webster | H01L 31/107 250/214 R |
| 2018/0017632 A1 | 1/2018 | Moore | |
| 2020/0355550 A1* | 11/2020 | Theiler | G01J 1/44 |

* cited by examiner

*Primary Examiner* — Kenneth Bukowski
(74) *Attorney, Agent, or Firm* — Slater Matsil, LLP

(57) ABSTRACT

An embodiment method of command of an electronic device comprises controlling a screen to alternate periodically between a first phase in which the screen emits light and a second phase in which no light is emitted by the screen, and precharging a charge pump of an ambient light sensor during the first phases, the ambient light sensor comprising at least a single photon avalanche diode powered by the charge pump.

19 Claims, 4 Drawing Sheets

METHOD AND DEVICE FOR AMBIENT LIGHT MEASUREMENT

CROSS-REFERENCE TO RELATED APPLICATIONS

This application claims the benefit of European Patent Office Application No. 19218320.0, filed on Dec. 19, 2019, which application is hereby incorporated herein by reference.

TECHNICAL FIELD

The present disclosure relates generally to electronics devices, and more specifically to an electronic device comprising an ambient light sensor and to a method of measuring ambient light using such a device.

BACKGROUND

Electronic devices such as mobile telephones or tablet or computers comprising screens permit the display information and/or images destined for a user of the device.

In such devices, the light power emitted by the screen can be adapted at least partially as a function of the level of ambient light, this level of ambient light being measured by means of an ambient light sensor (ALS). For example, this ambient light measurement is used to adjust the light power emitted by the screen as a function of the level of ambient light for a better perception of image displayed on the screen by the human eye, as well as to save energy, and thus extend the battery life of a battery supplying the screen.

In known electronic devices comprising a screen and an ambient light sensor for measuring the intensity of the surrounding or ambient light, the sensor is disposed under a protective glass covering the screen, under a dedicated opening in the screen. It would be desirable to position the sensor under the screen, without a dedicated opening in the screen, the sensor capturing the weak transmission of the light through the screen. However, it is then difficult for the sensor to distinguish with precision from the ambient light passing through the screen from the exterior to the sensor the light emitted by the screen in the direction of the sensor.

SUMMARY

There is a need to address all or some of the drawbacks of the known electronic devices comprising a screen and a light sensor for measuring the level of ambient light surrounding the device.

Thus, one embodiment addresses all or some of the drawbacks of the known electronic devices comprising a screen and a light sensor for measuring the level of ambient light surrounding the device.

One embodiment provides a method of command of an electronic device comprising: controlling a screen to alternate periodically between a first phase in which the screen emits light and a second phase in which no light is emitted by the screen; and precharging a charge pump of an ambient light sensor during the first phases, the ambient light sensor comprising at least a single photon avalanche diode (SPAD) powered by the charge pump.

According to an embodiment, the method comprises the measurement, by the ambient light sensor of the ambient light during the second phases.

According to an embodiment, the charge pump starts precharging during the first phase before each second phase.

According to an embodiment, the duration between the activation of the charge pump and the beginning of the following second phase is at least equal to the precharge duration of the charge pump.

According to an embodiment, the charge pump is deactivated after every second phase.

According to an embodiment, the charge pump is deactivated during part of each first phase.

According to an embodiment, the method comprises a step of counting, from a starting point, edges of a timing signal to generate a count value, wherein the charge pump is activated when the count value reaches a first value is reached.

According to an embodiment, the first value is equal to the period of the second phases minus a second duration at least equal to the precharge duration, and the starting point is the beginning of each second phase.

According to an embodiment, the first value is equal to the duration of the first phases minus a second duration at least equal to the precharge duration, and the starting point is the end of each second phase.

According to an embodiment, the second duration is equal to the sum of the precharge duration and a third duration, the third duration being less than 20 µs.

According to an embodiment, the first value is stored in a memory.

Another embodiment provides an electronic device comprising: a screen configured to alternate periodically between a first phase in which the screen emits light and a second phase in which no light is emitted by the screen; an ambient light sensor, comprising at least a SPAD powered by a charge pump; and a control circuit configured to ensure the precharge of the charge pump during the first phase.

According to an embodiment, the device comprises comprising a control circuit configured to enable the ambient light sensor and the charge pump.

According to an embodiment, the device comprises a counting element configured to count, from a starting point, edges of a timing signal to generate a count value, to a first value.

According to an embodiment, the device comprises a memory storing the first duration.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the devices considered, for example phones or tablet or computers, comprise various components and circuits that will now be described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
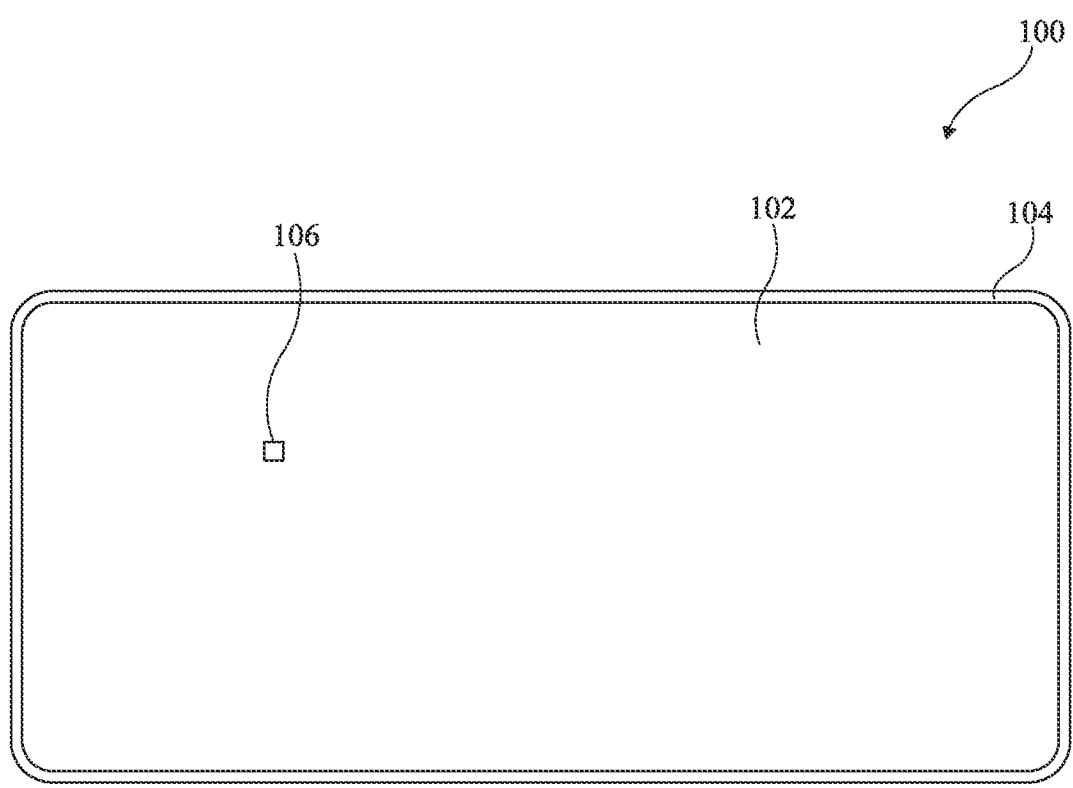
FIG. 1 is a front view of an embodiment of an electronic device.

FIG. 1 illustrates, very schematically, an embodiment of an electronic device 100. More precisely, FIG. 1 is a front view of the device 100. The device 100 is, in this example, a mobile phone.

The device 100 comprises a screen 102. The screen 102 is configured to display images and/or information to a user. In order to do so, the screen comprises a plurality of light emitting elements (not represented), for example a plurality of light emitting diodes (LED). The screen comprises for example a matrix, or array, of pixels, each pixel comprising one or more light emitting elements of the plurality of light emitting elements.

The device 100 comprises an electronic system, not represented. The electronic system comprises various circuits and components, including a control circuit configured to control the screen and the content displayed, and in particular, configured to control the light emitting elements.

When the screen is in operation, in other words, when images and/or information are displayed on the screen, the screen alternates between two phases. During first phases, the screen 102 is activated and emits light. In other words, during the first phases, at least a portion of the light emitting elements emits light, and in some cases all the light emitting elements emit light. During second phases, the light emitting elements 102 are deactivated or turned off. In other words, the screen 102 emits no light during the second phases.

The average light power emitted by the screen and perceived by a user is adapted by modifying the duty cycle and/or the frequency of the screen activation, for example by adjusting the duration of the phases of light emission and/or the duration of the phases in which no light is emitted. With adequate switching frequencies between the phases in which the screen emits light and the phases in which the screen is turned off, the user of the screen does not perceive the transitions between these phases, due to the persistence of vision of the human eye. For example, the switching frequency is at least 25 Hz.

For example, the screen is controlled by a binary control signal SC_LED, a first state of which causes the first phase, and a second state of which causes the second phase. This control signal SC_LED generally undergoes pulse-width modulation (PWM) or pulse-frequency modulation (PFM).

The type of screen, for example LCD (Liquid Crystal Display) or OLED (Organic Light Emitting Diode), to which such control modes apply and the manner of implementation of these control modes have not been described in detail. The described embodiments are compatible with these known control modes and the known screens to which these control modes apply.

The screen comprises, in addition to the light emitting elements, a protective layer, for example a protective glass. The protective layer covers all the light emitting elements. The protective layer is at least partially transparent to the light being emitted by the light emitting elements.

The device wo also comprises a housing, or shell, 104. The housing 104 surrounds the various circuits and boards comprised in the electronic systems of the device 100. For example, the control circuit is situated in the housing 104.

The device 100 further comprises at least one ambient light sensor 106. While only one ambient light sensor is represented in FIG. 1, the device 100 may comprise a greater number of ambient light sensors.

In order to save space on the device, it is sometimes preferable to place the sensor under the screen, preferably under the light emitting elements, without a dedicated opening in the screen, as represented in FIG. 1.

Figure 2:
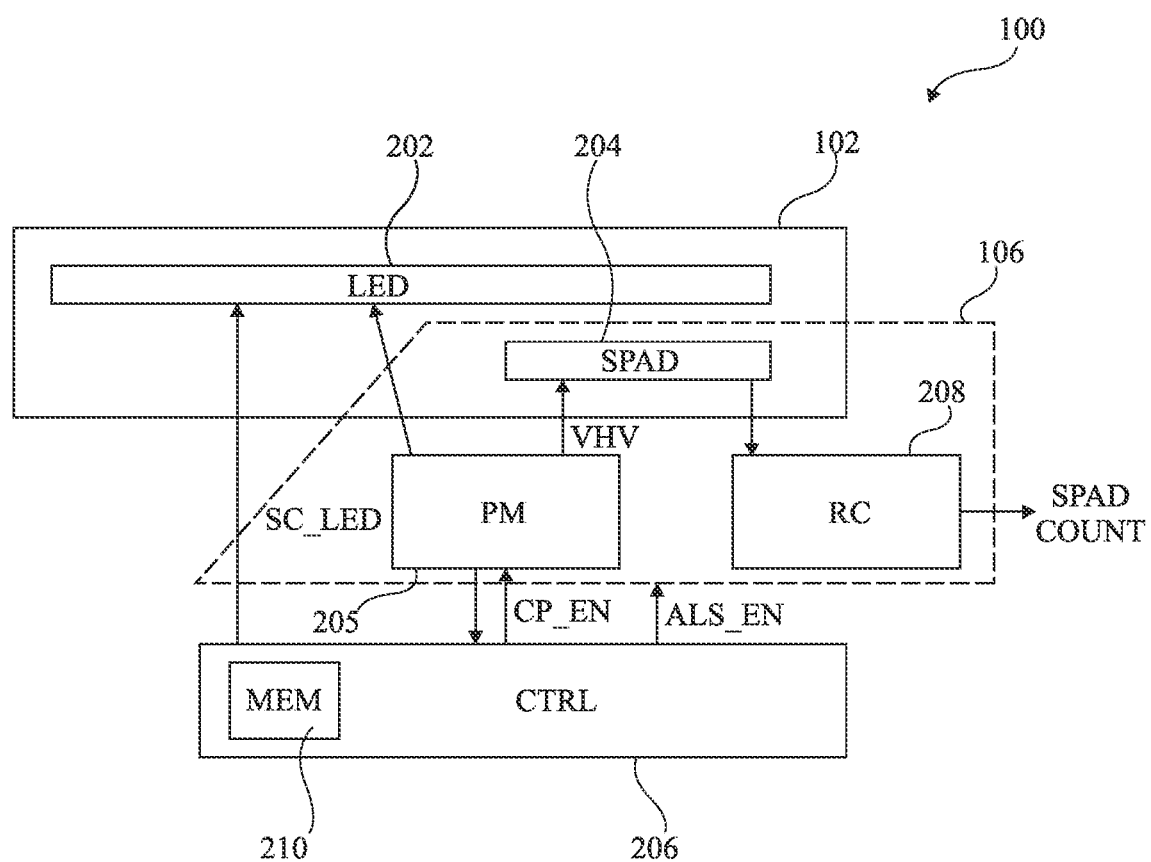
FIG. 2 is a block diagram illustrating the electronic device of FIG. 1 in more detail according to an example embodiment.

FIG. 2 is a block diagram illustrating the device 100 of FIG. 1 in more detail.

The device 100 comprises the screen 102. As described in relation with FIG. 1, the screen 102 comprises light emitting elements 202 (LED). While only one light emitting element 202 is represented, the screen comprises a plurality of elements 202.

The device 100 comprises the ambient light sensor 106. The ambient light sensor 106 comprises a SPAD 204. While only one SPAD 204 is represented, the device can comprise a plurality of SPADs 204. The SPAD 204 is for example located in the screen 102. The SPAD is for example located under a level at which the light emitting elements 202 are formed.

The device comprises a power management circuit 205 (PM). The power management circuit 205 is configured to power the SPAD 204. More precisely, the power management circuit 205 is configured to provide a voltage VHV, to the SPAD 204. The level of the voltage VHV, while the ambient light sensor is operating, is for example of a higher value than the voltage generally used to power the light emitting elements. The power management circuit 205 comprises a charge pump (not illustrated in FIG. 2) in order to provide the voltage VHV and power the SPAD 204. The charge pump provides the voltage VHV to the SPAD 204. For example, the power management circuit 205 receives a voltage of substantially 3.3 V and provides a voltage VHV of between 10 V and 20 V to the SPAD 204.

The power management circuit 205 can also be configured to provide a supply voltage for powering the light emitting elements 202. The power management circuit 205 can also be configured to provide a supply voltage for powering other circuits of the device.

The device wo comprises a control circuit (CTRL) 206. The control circuit 206 is configured to control the light emitting elements 202. Therefore, the control circuit 206 is configured to send the signal SC_LED controlling the activation of the light emitting elements. The signal SC_LED controls, for in particular, the alternation between the first and second phases, in order to control the light perceived by the user, and the frequency at which the first and second phases alternate (hereafter referred to as the frequency of alternation).

The control circuit 206 for example comprises a memory (MEM) 210, for example formed of one or more registers. For example, the memory stores an indication of the period at which the first and second period alternate, in other words the sum of the durations of the first and second phases. For example, the duration of each of the first phases and/or the duration of the second phases is also stored in the memory 210.

The frequency of alternation can be modified, for example because of a variation in ambient light or because of a choice by the user. In this case, the values stored in the memory 210 are updated.

The control circuit 206 is for example powered by the power management circuit 205.

The control circuit 206 is also configured to control the activation and deactivation of the charge pump of the power management circuit 205. For example, the control circuit 206 is configured to send a control signal CP_EN to the power management circuit in order to activate or deactivate the charge pump. For example, the signal may comprise at least two states.

If the signal CP_EN is in a first state, the charge pump starts a precharge phase during which the charge pump charges, and therefore during which the voltage VHV increases until it reaches the voltage value desired to power the SPAD. If the signal CP_EN is in a second state, the charge pump stops providing the power to the SPAD and discharges.

The control circuit 206 is further configured to activate and deactivate the ambient light sensor 106. More precisely, the control circuit 206 is configured to send a control signal ALS_EN to the ambient light sensor. For example, the signal ALS_EN can cause the activation and deactivation of the SPAD. The control signal ALS_EN for example comprises at least two states. The control signal ALS_EN for example comprises a first state, which causes the ambient light sensor to be deactivated. The control signal ALS_EN for example comprises a second state, which causes the ambient light sensor to be activated. In other words, if the SPAD is provided the desired voltage VHV and if the signal ALS_EN is in the second state, the ambient light sensor provides an output signal SPADCOUNT representative of the quantity of light perceived by the sensor during the period of activation of the ambient light sensor.

The period of activation is, in the example of FIG. 2, a period during which the signal CP_EN is in the first state and during which the signal ALS_EN is in the second state. More generally, an activation period is a period between an activation of the ambient light sensor and the following deactivation of the ambient light sensor.

The ambient light sensor 106 is configured to measure the ambient light during the second phases of the screen, in other words, during the phases in which the screen emits no light. Therefore, the periods of activation are the periods corresponding to the second phases of the screen. Preferably, the ambient light sensor measures the light during most of the duration of each second phase, preferably during at least 80% of each second phase. It is advantageous as, during the first phases of the screen, in other words during the phases in which the screen emits light, it is difficult to distinguish the light emitted by the screen from the ambient light.

The ambient light sensor 106 further comprises a counter 208 (RC). The counter 208 provides the value SPAD-COUNT.

Every time the avalanche of the SPAD is triggered, in other words, every time the SPAD detects light, the avalanche current causes the charge of a capacitor, not represented, associated with the SPAD. Therefore, the voltage across the capacitor increases from a reference voltage. When the voltage across the capacitor reaches a threshold, the counter 208 increments the value SPADCOUNT and the voltage across the capacitor is reset to the reference value. The value SPADCOUNT, in other words the number of times the threshold has been reached, is therefore representative of the quantity of light perceived by the sensor.

One advantage of using a SPAD in the ambient light sensor is that it can be triggered by a single photon, and therefore is sensitive to very low levels of light. A SPAD is sensitive enough to be able to perceive the ambient light while being situated under the light emitting elements 202 in the screen.

Figure 3:
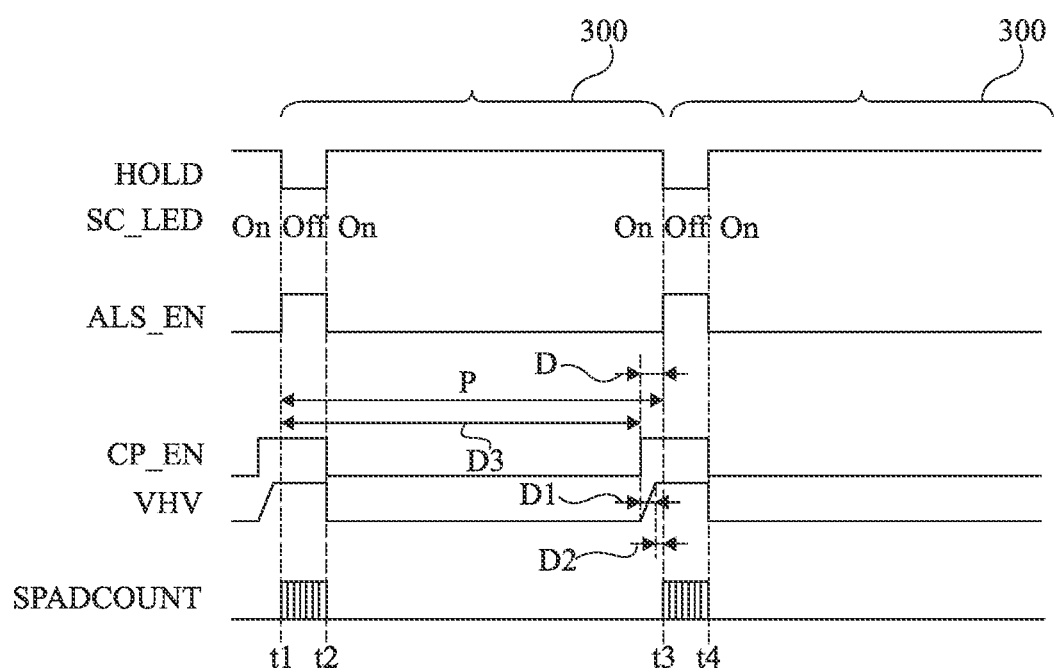
FIG. 3 is a timing diagram illustrating the operation of the embodiment of FIG. 2.

FIG. 3 is a timing diagram illustrating the operation of the embodiment of FIG. 2. FIG. 3 represents, as a function of time, the state of the light emitting elements (represented by a binary signal HOLD), the control signal CP_LED, the control signal ALS_EN, the control signal CP_EN, the voltage VHV and the signal SPADCOUNT.

The signal HOLD, representing the state of the light emitting elements, is at a high value when the screen is enabled (first phase of the screen), in other words when at least some of the light emitting elements emit light. The signal HOLD is at a low value when the screen is disabled (second phase of the screen), in other words when the screen emits no light.

The control signal SC_LED is provided by the control circuit 206 to the light emitting elements 202 in order to control the state of the light emitting elements. In this example, the control signal SC_LED has two values: a first value corresponding to an "On" state, in which the control signal SC_LED causes the screen to be in the first phase, and a second value corresponding to an "Off" state, in which the control signal SC_LED causes the screen to be in the second phase.

The control signal ALS_EN is provided by the control circuit to the ambient light sensor in order to control the state of the ambient light sensor. In this example, the control signal ALS_EN takes a high value in order to enable the ambient light sensor, in other words in order to allow the sensor to measure the light. In this example, the control signal ALS_EN takes a low value in order to disable the ambient light sensor, in other words in order to ensure that the ambient light sensor stops measuring the light.

The control signal CP-EN is provided by the control circuit 206 to the charge pump in order to control the state of the charge pump. In this example, the control signal CP_EN takes a high value in order to enable the charge pump, in other words in order to allow the charge pump to provide the desired voltage to power the SPAD. In this example, the control signal CP_EN takes a low value in order to disable the charge pump, in other words in order to stop providing the voltage to the SPAD and to allow the discharge of the charge pump.

The voltage VHV corresponds to the voltage provided by the charge pump to the SPAD. The value of the voltage VHV varies between a low value, for example substantially equal to 0 V, and a high value, for example in the range from 10 V to 20 V. If the value of the voltage VHV is below the high value, the SPAD cannot operate and cannot measure the ambient light. Therefore, it is preferable for the voltage VHV to be equal to the high value when the control signal ALS_EN takes the high value, in other words when the control circuit enables the ambient light sensor.

The signal SPADCOUNT is the signal representative of the light perceived by the sensor.

FIG. 3 represents two cycles 300 of alternation between the first and second phases of the screen, each cycle comprising a first phase and a second phase.

At the start of the period represented in the timing diagram, the control signal SC_LED has a value corresponding to the "On" state. Therefore, the signal HOLD is initially at the high value, signifying that the screen is in the first phase.

At an instant t1, the control circuit 206 modifies the value of the control signal SC_LED. The value of the control signal SC_LED becomes the value corresponding to the "Off" state. Therefore, the signal HOLD transitions to the low value, signifying that the screen is in the second phase.

At an instant t2, following the instant t1, the control circuit 206 modifies the value of the control signal SC_LED. The value of the control signal SC_LED returns to the value corresponding to the "On" state. Therefore, the signal HOLD transitions to the high value, signifying that the screen is in the first phase.

The variations of the signals HOLD and SC_LED at instants t3 and t4, following instant t2, are identical to their variations at respective instants t1 and t2. Therefore, at instant t3, the signal HOLD transitions from a high value to a low value, and the signal SC_LED transitions from an "On" state to an "Off" state. At the instant t4, the signal HOLD transitions from a low value to a high value, and the signal SC_LED transitions from an "Off" state to an "On" state.

During the second phases of the screen, the ambient light sensor is enabled, and can measure light. The ambient light sensor is preferably only enabled during the second phases. In the example of FIG. 3, this is represented by the fact that the control signal ALS_EN has a high value between the instants t1 and t2 and between the instants t3 and t4, and a low value elsewhere.

In order to avoid consuming power while the ambient light sensor, and thus the SPAD, are not in operation, the charge pump is deactivated during at least part of the first phases of the screen.

The charge pump is activated before each second phase of the screen and deactivated after each second phase of the screen. In the example of FIG. 3, the charge pump is activated before the beginning of each second phase and the charge pump is deactivated at the end of each second phase. Therefore, the control signal CP_EN is modified by the control circuit in order to go from its low value to its high value before the instants t1 and t3 and to go from its high value to its low value at, or soon after the instants t2 and t4.

The charge pump is activated sufficiently before the beginning of each second phase so that the voltage VHV reaches the high value before the beginning of the second phase.

In the example of FIG. 3, the charge pump is activated for a duration D before the beginning of each second phase. In the example of FIG. 3, the duration D comprises at least the duration D1 of the precharge of the charge pump, and preferably comprises the duration D1 and a duration D2. The duration D2 can be added to the duration D1 in order to ensure that the high value is reached before the instant t1 or t3.

In order to enable the charge pump at the desired instant, the control circuit 206 for example has access to the value of the duration D and to the value of the period P of alternation of the screen.

The period P of alternation of the screen corresponds for example to the duration between the start of a second phase and the start of the following second phase of the screen. The period P corresponds for example to the duration between a rising edge of the signal ALS_EN and the following rising edge of the signal ALS_EN. The period P of alternation of the screen can also for example correspond to the duration between the end of a second phase and the end of the following second phase of the screen. The period P corresponds for example to the duration between a falling edge of the signal ALS_EN and the following falling edge of the signal ALS_EN. In the example of FIG. 3, the period P corresponds to the duration between t1 and t3.

The period P and the duration D are for example known by the control circuit 206. For example, the value of the period P and the duration D are stored in the memory 210 of FIG. 2.

The control circuit can thus determine the duration D3. For example, the control circuit computes the duration D3 as being equals to the period P minus the duration D. The duration D3 corresponds to the duration between the beginning of each of the second phase and the beginning of the precharge of the charge pump corresponding to the next second phase. Therefore, the control circuit 206 can determine how long after the start of the second phase to activate the charge pump for the next second phase.

Alternatively, each possible value, or each possible range of values, of the period P can be associated with a value of the duration D3. The various values of the period P, or the various ranges of values of the period P, as well as the associated values of the duration D3 can for example be stored in the memory 210. The various values of the period P, or the various ranges of values of the period P, as well as the associated values of the duration D3 can for example be determined and programmed in the device during the programming of the device.

For example, the period P is in the range from 1 ms to 10 ms. The duration D3 is for example in the range from 50 μs to 100 μs. The duration D1 is for example in the range from 40 μs to 100 μs. The duration D2 is for example less than 20 μs.

Between instants t1 and t2, and between instants t3 and t4, in other words, during the second phases, the value of the signal SPADCOUNT is increased depending on the ambient light received by the sensor. This is represented in FIG. 3 by the striped blocks. During the first phases, the value SPADCOUNT is not representative of the ambient light and is preferably equal to a reference value, for example equal to 0.

According to another embodiment, the control circuit 206 has access to the duration of the first phases rather than the period P. The duration D3 corresponds therefore to the duration between the end of a second phase and the beginning of the precharge of the charge pump corresponding to the next second phase.

Figure 4:
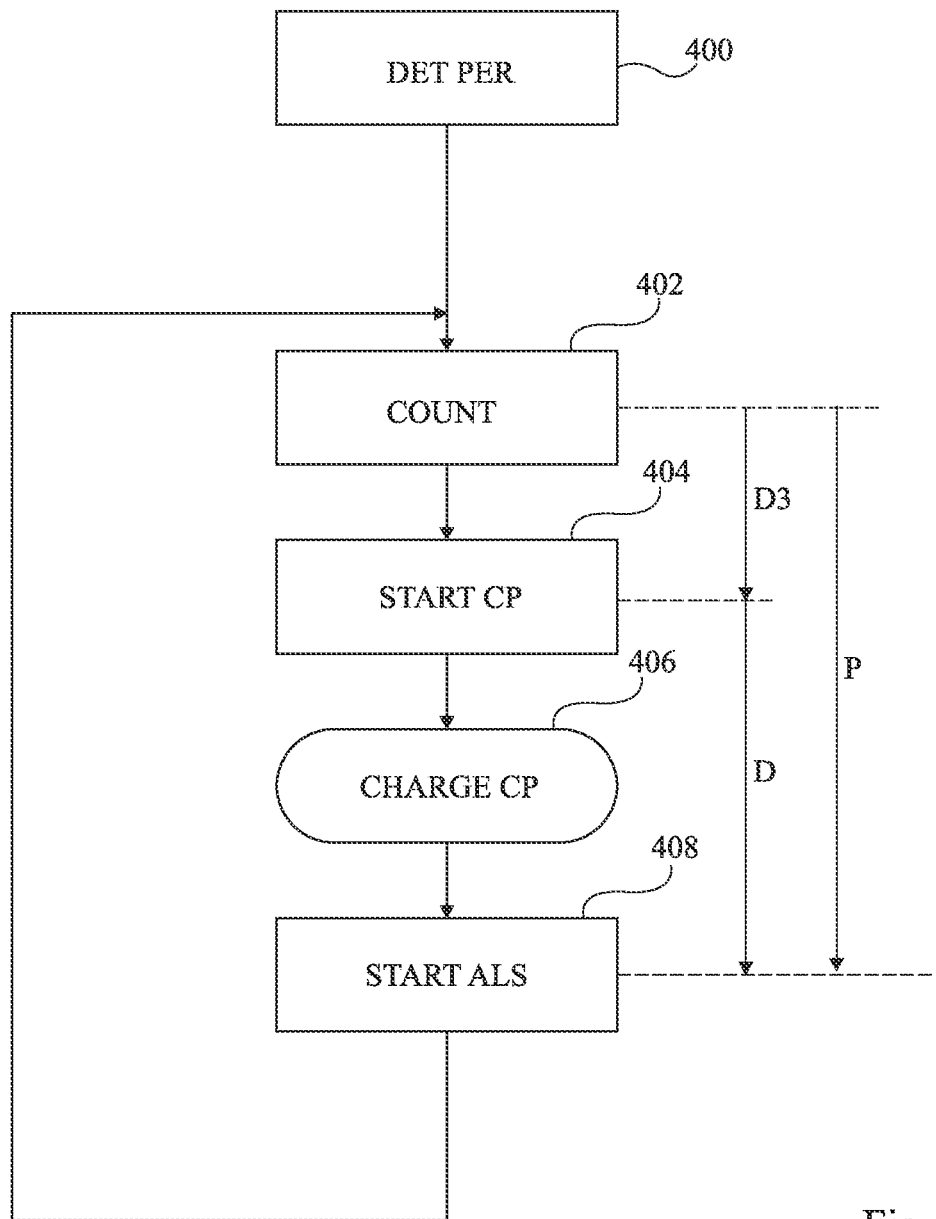
FIG. 4 is a flow diagram illustrating an example of the operation of the embodiment of FIG. 2.

FIG. 4 is a flow diagram illustrating the operation of the embodiment of FIG. 2.

During an operation 400 (DET PER), the control circuit 206 determines the duration D3, in other words the duration between the beginning of a second phase and the beginning of the precharge of the charge pump corresponding to the next second phase. The control circuit 206 for example computes the duration D3 by subtracting the duration D from the period P of alternation of the first and second phases. The duration D is preferably known to the control circuit 206. The period P is also preferably known to the control circuit 206. Both values are for example stored in the memory 210.

During an operation 402 (COUNT), a counter associated with the control circuit starts counting the edges (for example the rising edges) of a timing signal. For example, the counter starts counting from 0. Preferably, the frequency of the timing signal is sensibly constant. When the counter has incremented by the value corresponding to the duration D3, the charge pump is enabled (block 404, START CP). In other words, in the case of FIG. 3, when the counter has incremented by the value of the duration D3, the control signal CP_EN takes the high value.

In the case of FIG. 3, if the duration corresponds to the duration from a rising edge of the signal ALS_EN to the next rising edge of the signal ALS_EN, the counter starts counting at the rising edge of the signal ALS_EN.

Alternatively, the duration D3 could correspond to a duration between another starting point and the beginning of the precharge of the charge pump corresponding to the next second phase. For example, the duration D3 could be the duration between the end of a second phase, for example the falling edge of the signal ALS_EN, and the beginning of the precharge of the charge pump corresponding to the next second phase.

The charge pump then precharges (block 406, CHARGE CP) in order for the voltage VHV to reach the desired value.

After the duration D, after the start of the precharge, in other words after the period P since the beginning of the previous second phase, a new second phase begins. In other words, the ambient light sensor starts measuring the light (block 408, START ALS).

Furthermore, the operation 402 is carried out in relation with the new second phase and therefore, the counter starts counting at the new starting point of the duration D3. For example, the operation 402 is carried out in parallel with the operation 408 and the counter starts counting as the next second phase starts. If the value of the period P has changed, a new value of the duration D3 is computed.

The charge pump could be controlled to start charging at the beginning of the second phase of the screen, in other words, the ambient light sensor and the charge pump could be enabled at the same instant. However, during the duration of the precharge, the ambient light sensor would not be operational, therefore the measurement duration would be greatly shortened, and the measurement would be less meaningful.

At least part of the process can be implemented in software. In this case, the control circuit 206 comprises a microprocessor or a microcontroller, configured to implement this part of the process. For example, the software implements the counting of the duration D3 and/or the generation of the control signals.

An advantage of embodiments described herein is that they permit the measurement of the ambient light during the most of the second phase and no time is lost by the precharge of the charge pump.

Another advantage of embodiments described herein is that the SPAD is able to measure low levels of light, which permits the placement of the ambient light sensor under the screen, and in particular, under the light emitting elements.

Another advantage of embodiments described herein is that the activation of the ambient light sensor during the second phase avoids the measurement being disrupted by the light emitted during the first phases.

Another advantage of embodiments described herein is that the deactivation of the charge pump during part of each first phase reduces the power consumption of the ambient light sensors.

Various embodiments and variants have been described. Those skilled in the art will understand that certain features of these embodiments can be combined and other variants will readily occur to those skilled in the art. In particular, while FIG. 1 represents a mobile phone, the described embodiments can be applied to other devices comprising a light emitting screen and ambient light sensor in which the light of the screen might disturb the measurement of the ambient light. The embodiments can be applied to devices in which the ambient light sensors are not amongst the light emitting elements, but in a region adjacent to the light emitting elements, particularly in the case when the light emitting elements and the ambient light sensors are disposed under a same protective glass.

Furthermore, it was considered that the first and second phases started and ended at the transitions of the control signal SC_LED, and thus that the state of the screen was known by the control circuit. Alternatively, the state of the screen can be determined in another way, for example using the method described in the patent application (No. APPLICATION B19131)

Finally, the practical implementation of the embodiments and variants described herein is within the capabilities of those skilled in the art based on the functional description provided hereinabove.

What is claimed is:

1. A method of operating an electronic device, the method comprising:
controlling a screen to alternate periodically between a first phase in which the screen emits light and a second phase in which no light is emitted by the screen;
precharging, using a charge pump enable signal, a charge pump of an ambient light sensor during the first phases, the ambient light sensor comprising at least one single photon avalanche diode, a start of each precharging based at least on a period of the second phases, a time between an activation of the charge pump enable signal during each first phase and a beginning of a next second phase being at least equal to a precharge duration of the charge pump; and
powering, by the charge pump, the single photon avalanche diode.

2. The method according to claim 1, comprising measuring, by the ambient light sensor, ambient light during the second phases.

3. The method according to claim 1, further comprising deactivating the charge pump after each second phase.

4. The method according to claim 1, further comprising deactivating the charge pump during part of each first phase.

5. The method according to claim 1, further comprising:
counting, from a starting point, edges of a timing signal to generate a count value; and
activating the charge pump in response to the count value reaching a first value.

6. The method according to claim 5, wherein the first value is equal to the period of the second phases minus a second duration at least equal to the precharge duration, and the starting point is a beginning of each second phase.

7. The method according to claim 6, wherein the second duration is equal to a sum of the precharge duration and a third duration, the third duration being less than 20 µs.

8. The method according to claim 5, wherein the first value is equal to a duration of the first phases minus a second duration at least equal to the precharge duration, and the starting point is an end of each second phase.

9. The method according to claim 8, wherein the second duration is equal to a sum of the precharge duration and a third duration, the third duration being less than 20 µs.

10. The method according to claim 5, wherein the first value is stored in a memory.

11. An electronic device comprising:
a screen configured to alternate periodically between a first phase in which the screen emits light and a second phase in which no light is emitted by the screen;
an ambient light sensor, comprising:
a charge pump; and
at least one single photon avalanche diode powered by the charge pump; and
a control circuit configured to precharge the charge pump during the first phases using a charge pump enable signal, wherein a start of each precharging is based at least on a period of the second phases, and wherein a time between an activation of the charge pump enable signal during each first phase and a beginning of a next second phase is at least equal to a precharge duration of the charge pump.

12. The device according to claim 11, wherein the control circuit is configured to enable the ambient light sensor and the charge pump.

13. The device according to claim 11, further comprising a counter configured to count, from a starting point, edges of a timing signal to generate a count value, to a first value.

14. The device according to claim 13, further comprising a memory storing the first value.

15. The device according to claim 13, wherein the control circuit is configured to activate the charge pump in response to the count value reaching the first value.

16. The device according to claim 13, wherein the first value is equal to the period of the second phases minus a second duration at least equal to the precharge duration, and the starting point is a beginning of each second phase.

17. The device according to claim 13, wherein the first value is equal to a duration of the first phases minus a second duration at least equal to the precharge duration, and the starting point is an end of each second phase.

18. The device according to claim 16, wherein the second duration is equal to a sum of the precharge duration and a third duration, and wherein the third duration is less than 20 µs.

19. The device according to claim 17, wherein the second duration is equal to a sum of the precharge duration and a third duration, and wherein the third duration is less than 20 µs.

* * * * *